United States Patent [19]
Dwyer et al.

[11] Patent Number: 5,958,234
[45] Date of Patent: *Sep. 28, 1999

[54] SUCTION STRAINER WITH AN INTERNAL CORE TUBE

[75] Inventors: Paul M. Dwyer, Olathe; Gordon H. Hart, Shawnee; Carl E. Nuzman, Mission Woods; Gordon P. Pinsky, Olathe, all of Kans.

[73] Assignee: Performance Contracting, Inc., Shawnee, Kans.

[ * ] Notice: This patent is subject to a terminal disclaimer.

[21] Appl. No.: 09/137,595

[22] Filed: Aug. 21, 1998

Related U.S. Application Data

[63] Continuation of application No. 08/904,604, Aug. 1, 1997, Pat. No. 5,843,314, which is a continuation of application No. 08/542,730, Oct. 13, 1995, Pat. No. 5,696,801
[60] Provisional application No. 60/003,266, Aug. 24, 1995.
[51] Int. Cl.[6] ........................ G21C 19/307; B01D 35/027
[52] U.S. Cl. ........................... 210/315; 210/461; 376/313
[58] Field of Search .................................. 376/282, 283, 376/299, 313; 210/256, 315, 437, 345, 460, 461; 166/56, 205, 236

[56] References Cited

U.S. PATENT DOCUMENTS

| 1,329,171 | 1/1920 | Garry et al. | 210/460 |
| 1,397,836 | 1/1921 | Karns | 166/105.1 |
| 2,257,344 | 9/1941 | Maloney | 166/5 |

(List continued on next page.)

FOREIGN PATENT DOCUMENTS 219188  7/1924  United Kingdom .

OTHER PUBLICATIONS

Nuclear Services & Valves—Suction Strainers with Stingent Requirements for the Emergency Cooling Systems of Nuclear Power Plants—Sulzer Thermtec, Aug. 1995.

Eucastream—Suction Flow Control Device, Kabelwerk Eupen, Belgium, Aug. 1995.

Effect of Suction Flow Control Device in Wells; G. Ehrhardt & R. Pelzer, 1992.

New ideas for cylindrical pipe intakes can help reduce fish and larvae kills; R. T. Burns, Burns & Roe Inc.; Power, Jun. 1980.

Washingto Public Power Supply System—Diagram Drawing, Dec. 1974.

*Primary Examiner*—Daniel D. Wasil
*Attorney, Agent, or Firm*—Womble Carlyle Sandridge & Rice; Louis T. Isaf

[57] ABSTRACT

A suction strainer includes a hollow internal core tube and an external filtering surface built around the internal core tube. A plurality of openings are defined through the side wall of the internal core tube core. In some cases the openings through the side wall are constructed and arranged such that there is somewhat less open area near the downstream end than the upstream end of the internal core tube, and the amount of open area tapers between the upstream end and the downstream end. As a result, when liquid is drawn into the internal core tube through the plurality of openings, a substantially uniform inflow distribution may be defined along substantially the entire length of the internal core tube. The internal core tube functions as a rigid structural support for the external filtering surface, enabling the apparatus to withstand post-LOCA hydrodynamic forces. The size of the filtering surface is enlarged by virtue of the fact that the filtering surface defines a plurality of filtering disk assemblies that are connected to and extend radially from the internal core tube. A separation distance is defined between neighboring disk assemblies, and filtering inner walls connect between neighboring disk assemblies and extend around the internal core tube at a radius less than the outermost radius of the disk assemblies. The total flow surface area is increased within a limited geometric profile. This serves to maximize surface area while minimizing post-LOCA reactive forces on attachment ECCS piping in a BWR suppression pool.

12 Claims, 7 Drawing Sheets

U.S. PATENT DOCUMENTS

| | | | |
|---|---|---|---|
| 2,622,683 | 12/1952 | Silitch et al. | 166/1 |
| 2,696,264 | 12/1954 | Colmerauer et al. | 166/235 |
| 2,837,032 | 6/1958 | Horsting, Sr. | 103/220 |
| 2,973,814 | 3/1961 | Adams et al. | 166/228 |
| 3,177,945 | 4/1965 | Fether | 166/227 |
| 3,280,911 | 10/1966 | Strange et al. | 166/228 |
| 3,357,564 | 12/1967 | Medford, Jr. et al. | 210/266 |
| 3,425,490 | 2/1969 | Clayton | 166/205 |
| 3,683,056 | 8/1972 | Brandt et al. | 264/112 |
| 4,014,387 | 3/1977 | Fink | 166/314 |
| 4,376,091 | 3/1983 | Netkowicz et al. | 376/283 |
| 4,624,319 | 11/1986 | Van Der Borght | 166/369 |
| 5,120,494 | 6/1992 | Nazareno et al. | 376/282 |
| 5,227,050 | 7/1993 | Stephan | 210/106 |
| 5,232,048 | 8/1993 | Whitebay et al. | 166/228 |
| 5,643,467 | 7/1997 | Romanco | 210/767 |
| 5,759,398 | 6/1998 | Kielbowicz | 210/416.1 |
| 5,759,399 | 6/1998 | Bilanin et al. | 210/416.1 |

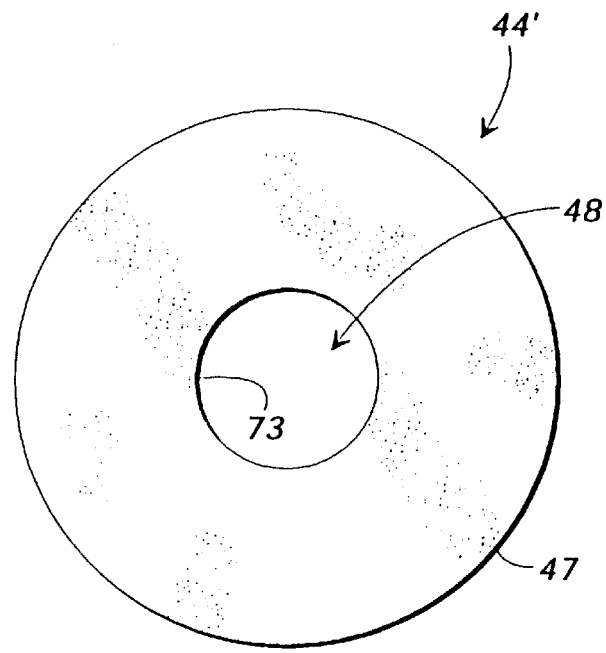
FIG. 6
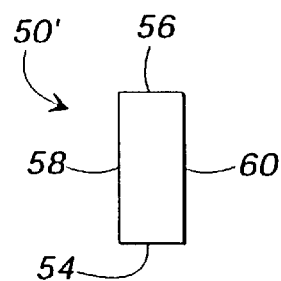
FIG. 7
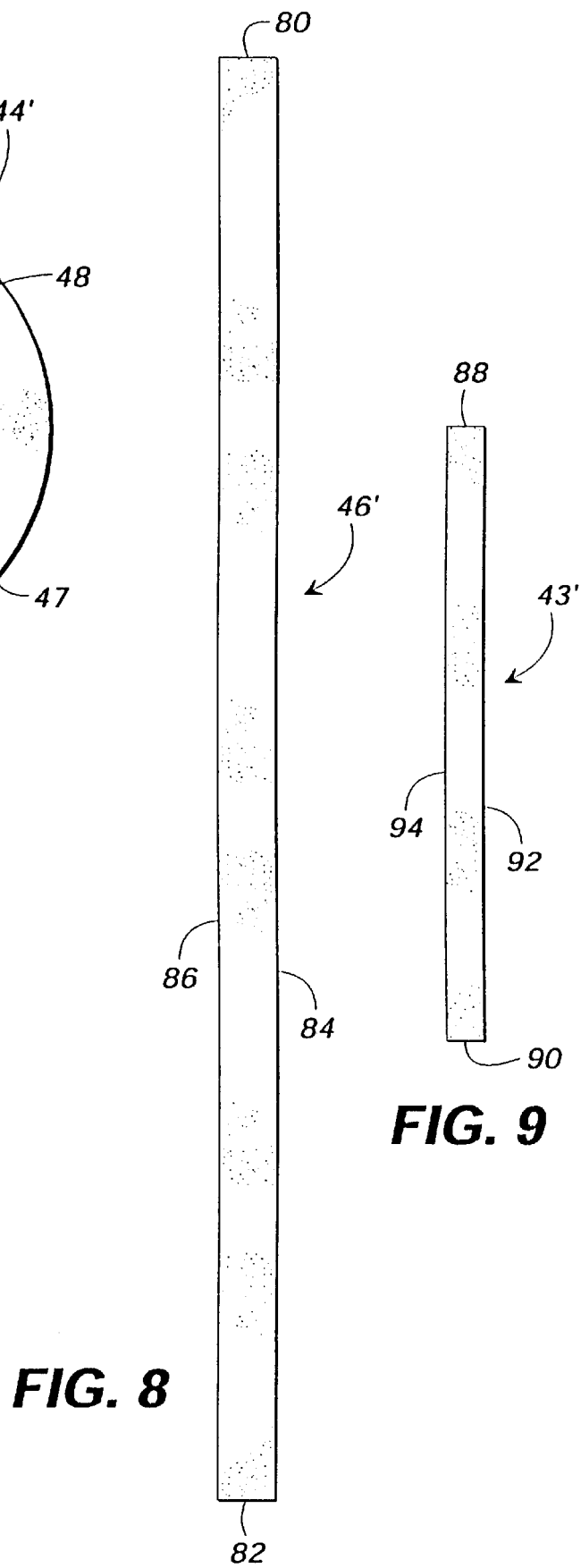
FIG. 8
FIG. 9

SUCTION STRAINER WITH AN INTERNAL CORE TUBE

CROSS REFERENCE TO RELATED APPLICATION

This application is a continuation of application Ser. No. 08/904,604, filed on Aug. 1, 1997, now U.S. Pat. No. 5,843,314, which is a continuation of application Ser. No. 08/542,730, filed on Oct. 13, 1995, now U.S. Pat. No. 5,696,801, which claims the benefit of provisional application Ser. No. 60/003,266, filed on Aug. 24, 1995.

BACKGROUND OF THE INVENTION

The present invention relates generally to the field of suction strainers, and more particularly to the field of suction strainers employed in the suppression pools of boiling water reactor (BWR) nuclear power plants.

A suction strainer employed in a suppression pool removes solids from a flow of liquid (e.g., water) being drawn into an emergency core cooling system (ECCS) pump. The flow of water is drawn through the suction strainer and then Into the suction line of the ECCS pump. Employment of suction strainers is desirable because solid debris drawn into the suction line of a pump can degrade pump performance by accumulating in the pump or its suction or discharge lines, or by impinging upon and damaging internal pump components.

While almost any pump degradation can be characterized as being costly, the degradation of ECCS pump performance at BWR nuclear plants can be detrimental to safe plant shutdown following a loss of coolant accident (LOCA). At a BWR nuclear power plant following a LOCA, it is critical for the ECCS pumps to operate for an extended period of time in an undegraded fashion. In one mode of operation, the ECCS pumps are operated to recirculate water from the suppression pool back to the reactor core for the purpose of core cooling. A LOCA results from a high pressure pipe rupturing with such great force that large quantities of debris, such as pipe and vessel insulating material, and other solids, may be washed into the suppression pool. Conventional ECCS suction strainers currently installed in BWR plants would have a tendency to become clogged by such debris due to their small size and poor design. Also, when the large pressure pipes rupture with great force, suction strainers in the suppression pool are subjected to great hydrodynamic forces that can damage the suction strainers as well as subject the attachment recirculation piping to large reactive forces. These structural considerations, and space constraints, limit the size and shape of suction strainers in suppression pools.

Conventional BWR plant suction strainers are typically constructed and arranged in a manner such that, under full flow conditions, localized high entrance velocities are established through that portion of the suction strainer that is most proximate to the suction line of the pump, while low entrance velocities are established through that portion of the suction strainer that is more distant from the suction line of the pump. The high entrance velocities may draw more solid debris into contact with the suction strainer causing the portions of the suction strainer experiencing the high entrance velocities to experience higher head loss. As the portion of the suction strainer most proximate to the suction line collects debris, high entrance velocities are established at the portion of the suction strainer that is next closest to the suction line causing that portion to collect debris. This process often continues until the entire suction strainer has collected debris in varying quantities, resulting in a non-uniform build-up of debris on the outer surface of the strainer.

Localized high entrance velocities can be detrimental even when solids are not present in the liquid being pumped. For example, high entrance velocities can result in turbulent flow which tends to create greater pressure losses than laminar flow. Any such pressure losses reduce the net positive suction head (NPSH) available to a pump. As the NPSH available decreases, pump cavitation may occur. Similarly, localized high entrance velocities can cause vortexing. When a suction strainer is not sufficiently submerged, the vortexing can cause air ingestion which can severely degrade pump performance.

Attempts have been made to resolve certain of the problems associated with suction strainer-like devices in other applications. For example, cylindrical suction flow control pipes have been encircled with screen material and employed in water wells. Such wells typically employ a well pump above the ground surface and a riser pipe extending from the well pump to the water table. The suction flow control pipe is connected to the end of the riser pipe and extends further below the water table. Openings are defined through the side wall of the suction flow control pipe such that there is somewhat less open area near the riser pipe and somewhat more open area distant from the riser pipe. As a result, when water is drawn into the flow control pipe through the openings, a substantially uniform inflow distribution is defined along the length of the flow control pipe. While such suction flow control pipes offer some advantages, they are not suitable for all applications.

Attempts have been made, totally separate from flow control pipes, to increase filtering surface areas of BWR ECCS suction strainers in an effort to decrease pressure losses and thereby prevent pump cavitation. For example, such suction strainers may include a plurality of spaced, coaxial, stacked filtering disks. More particularly, such stacked disk suction strainers typically include an annular flange for attachment to the corresponding flange on the pump suction line. The stacked disk suction strainer provides an enhanced surface area and defines a longitudinal axis that is encircled by the attachment flange. A first disk is attached to the attachment flange. The first disk includes a pair of a radially extending, circular, disk walls, each of which encircle the longitudinal axis, and define a central hole. A first disk wall of the pair of disk walls is connected to the attachment flange. The first and second disk wall of the pair of disk walls face one another and are separated by a slight longitudinal distance. The first disk further includes an outer annular wall that encircles the longitudinal axis. The outer annular wall includes an annular first edge and an annular second edge. The entirety of the annular first edge of the outer annular wall is connected to the entire peripheral edge of the first perforated disk wall; and the entirety of the annular second edge of the outer annular wall is connected to the entire peripheral edge of the second perforated disk wall such that the pair of disk walls are connected at their periphery.

The stacked disk suction strainer further includes a plurality of inner annular walls that encircle the longitudinal axis, each of which includes an annular first edge and an annular second edge. The annular first edge of one of the inner annular walls is connected around the periphery of the central hole of the second disk wall. The annular second edge of that inner annular wall is connected around the periphery of the central hole of a disk wall of a second disk. The first and second disk walls, and the outer and inner annular walls are perforated and comprise the filtering surface of the stacked disk suction strainer. Additional perforated disks and inner annular walls are attached to one another in the above manner until the last disk is attached, wherein the outer disk wall of the last disk does not include a central hole. The stacked disk suction strainers may incorporate separate structural members to maintain the structural integrity of the stacked disk suction strainer. However, the conventional stacked disk suction strainers do not incorporate an internal core tube and related components, whereby the conventional stacked disk suction strainers are difficult to structurally reinforce and are susceptible to vortexing and the detrimental non-uniform localized entrance velocities discussed above.

There is, therefore, a need in the industry for an improved suction strainer.

SUMMARY OF THE INVENTION

Briefly described, the preferred embodiments of the of the present invention include a suction strainer that includes a filtering device with a strategically enlarged filtering surface and an internal core. The internal core is preferably in the form of an internal core tube, which is preferably an internal pipe with flow openings. In accordance with the preferred embodiments of the present invention, the internal core tube structurally reinforces the filtering device.

In accordance with the preferred embodiments of the present invention, the structural reinforcement provided by the internal core tube is enhanced by reinforcing structural members that extend radially from the internal core tube. The reinforcing structural members are preferably connected to and extend radially from and angularly around the internal core tube to structurally support the filtering surfaces of the external filtering structure. The internal core tube, in conjunction with the structural members, seeks to prevent air ingestion and vortexing. The suction strainer preferably extends away from the suction line of an ECCS pump to define a length, and in accordance with certain examples the preferred embodiments of the present invention, the internal core tube seeks to promote controlled inflow along the length to preclude the establishment of non-uniform localized entrance velocities through the filtering surface. In accordance with other examples of the preferred embodiments of the present invention, the internal core tube is not constructed to specifically promote such a uniform inflow along the length.

In accordance with the preferred embodiments of the present invention, the suction strainer is constructed in a manner that seeks to enlarge the filtering surface while minimizing the projected area of the suction strainer. The minimization of the projected area as well as structural reinforcement of the suction strainer enables the suction strainer to withstand high levels of hydrodynamic impact loading following a LOCA. The suction strainer also serves to minimize the bending moment and other reactive forces on the attachment ECCS piping in the BWR suppression pool.

In accordance with the preferred embodiments of the present invention, the filtering surface is defined by an external filtering structure that is attached to, extends from, and is built around the internal core tube and the reinforcing structural members. When the suction strainer is connected to the suction of a pump and submerged, a liquid flow path is established through the internal core tube and external filtering structure. The liquid originates exterior to the external filtering structure and is drawn through the filtering surfaces of the external filtering structure. The filtering surfaces separate solids from the liquid. The size of the filtering surface is enlarged by virtue of the fact that the filtering surface defines protrusions such that the distance that the filtering surface extends from the internal core tube alternates. The resulting enlarged filtering surface seeks to decrease average flow velocities through the filtering surface and thereby spread the collected solid debris in thinner layers, thereby decreasing overall pressure losses associated with the suction strainer. Once the liquid flows through the filtering surface, the liquid is drawn through the internal core tube and into the suction of the pump.

In accordance with the preferred embodiments of the present invention, the protrusions of the external filtering structure are in the form of a plurality of filtering plate assemblies that are connected to and extend radially from the internal core tube. Each plate assembly includes a pair of plate walls that face one another, define a distance therebetween, and are connected at their peripheries by an outer wall that surrounds the internal core tube. A separation distance is defined between neighboring plate assemblies. Inner walls connect between neighboring plate assemblies and extend around the internal core tube at a radius less than the radius of the outer walls. The outer and inner walls as well as the plate walls are perforated and comprise the filtering surfaces of the suction strainer. In accordance with first and second preferred embodiments of the present invention, the plurality of plate assemblies are preferably in the form of stacked disks that are spaced to defined troughs therebetween. In accordance with other embodiments, the plate assemblies are in other forms that increase the surface area of the suction strainer.

In accordance with preferred embodiments of the present invention, the internal core tube has a downstream end for connection to the pump suction flange and an upstream end distant from the downstream end. The internal core tube defines a longitudinal axis extending between the upstream and downstream ends. In accordance with the preferred embodiments of the present invention, a plurality of openings are defined through the side wall of the internal core tube. In accordance with certain examples of the preferred embodiments, the openings are constructed and arranged such that there is somewhat less open area near the downstream end than the upstream end, and the amount of open area tapers between the upstream end and the downstream end. As a result, when water flows into the internal core tube through the openings, a substantially uniform flow rate distribution is defined along substantially the entire length of the internal core tube.

It is therefore an object of the present invention to provide an improved BWR ECCS suction strainer.

Another object of the present invention is to increase safety by improving the operability of the ECCS of a BWR nuclear plant following a LOCA.

Yet another object of the present invention is to structurally reinforce a suction strainer sufficiently so that it can withstand the hydrodynamic forces following a LOCA in the suppression pool at a BWR nuclear plant.

Still another object of the present invention is to minimize reactive forces on the attachment ECCS piping following a LOCA.

Still another object of the present invention is to maximize the total strainer surface area within a limited geometric profile while providing a maximum strength strainer.

Still another object of the present invention is to simultaneously minimize both the thickness of collected debris on the strainer and the average entrance velocities to minimize the resultant NPSH of the ECCS following a LOCA.

Still another object of the present invention is to maximize the amount of time required to reach a particular head loss across the strainer.

Still another object of the present invention is to control the distribution of fluid flow over the strainer so as to collect debris uniformly, from disk to disk or from trough to trough, to allow scaling of the strainer for other flow rates with similar, but different size, strainers with different water flow rates.

Still another object of the present invention is to prevent vortexing and air ingestion.

Other objects, features and advantages of the present invention will become apparent upon reading and understanding this specification, taken in conjunction with the accompanying drawings.

BRIEF DESCRIPTION OF THE DRAWINGS

FIG. 6 is an isolated, schematic, elevational view of a wall of a filtering portion of the suction strainer of FIG. 3.

FIG. 7 is an isolated, plan view of a structural member of the filtering portion of the suction strainer of FIG. 3.

FIG. 8 is an isolated, schematic, plan view an outer wall of the filtering portion of the suction strainer of FIG. 3, wherein the outer wall is in an unrolled and flattened configuration.

FIG. 9 is an isolated, schematic, plan view an inner wall of the filtering portion of the suction strainer of FIG. 3, wherein the inner wall is in an unrolled and flattened configuration.

DETAILED DESCRIPTION OF THE PREFERRED EMBODIMENTS

Figure 1:
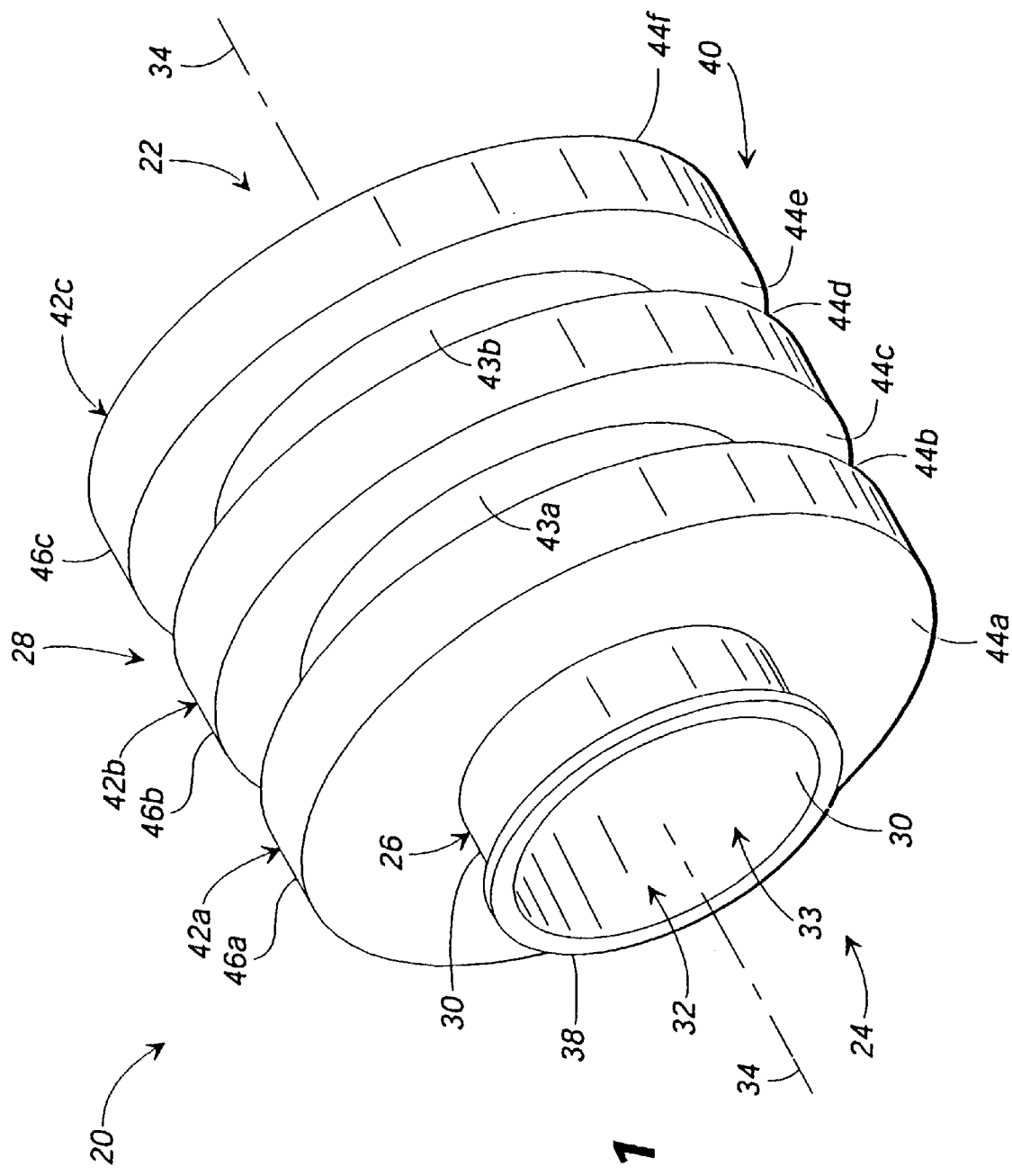
FIG. 1 is a schematic, downstream end, perspective view of a suction strainer with an internal core tube in accordance with one example of the first preferred embodiment of the present invention.

Referring now in greater detail to the drawings, in which like numerals represent like components throughout the several views, FIG. 1 is a schematic, perspective view of a suction strainer 20 with a core, in accordance with the first example of the first preferred embodiment of the present invention. The core is in the form of an internal core tube 26, and the suction strainer 20 further includes an upstream end 22, an opposite downstream end 24, and an exterior filtering structure 28 connected to and at least partially bounding the internal core tube 26. In accordance with the first preferred embodiment of the present invention, the internal core tube 26 is preferably in the form of a cylinder that structurally reinforces exterior filtering structure 28. The internal core tube 26 extends between the ends 22,24 and protrudes from the filtering structure 28 at the downstream end 24. The internal core tube 26 includes a core wall 30 that encircles and defines a core chamber 32. The core wall further defines a primary opening 33 that provides access to the core chamber 32, and the longitudinal axis 34 of the suction strainer 20. The portion of the core wall 30 that is internal to the filtering structure 28 preferably defines a plurality of openings therethrough (for example, see openings 74,76,78 defined through core wall 30' in FIG. 5), as will be discussed in greater detail below. The portion of the core wall 30 that extends from the filtering structure 28 at the downstream end 24 is preferably not perforated.

Figure 10:
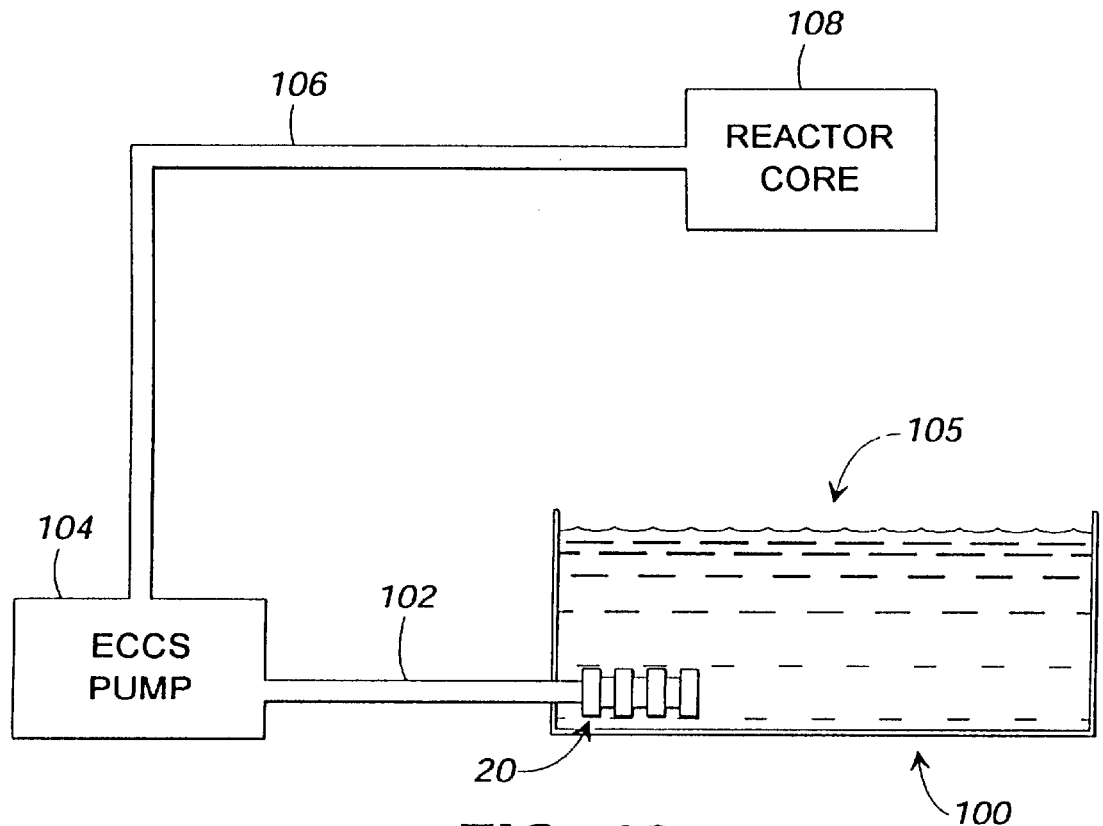
FIG. 10 is a schematic representation of portions of a BWR nuclear power plant, wherein the suction strainer of FIG. 1 is connected the ECCS of the power plant.

The filtering structure 28 encircles a majority of the internal core tube 26 and includes an exterior filtering surface 40. FIG. 1 is schematic in nature because, as will be discussed in greater detail below, the entire filtering surface 40 is preferably perforated (i.e., the filtering surface 40 defines a plurality of openings therethrough). The perforations are not depicted in FIG. 1 in an effort to clarify the view. The filtering surface 40 further defines a plurality of protrusions such that the contour of the filtering surface 40 is varied to uniquely maximize the effective filtering area of the filtering surface 40 within a limited geometric profile described by the length and outer diameter of the suction strainer 20. The filtering structure 28 includes a plurality of spaced protrusions which cooperate to define peaks and valleys. In accordance with the first preferred embodiment of the present invention, the protrusions are in the form of plate assemblies 42a–c which are preferably in the form of circular disks, and the valleys defined between the disks are in the form of annular troughs. In accordance with the first preferred embodiment of the present invention, the disk and troughs are preferably arranged in a uniform and consistent pattern. While the suction strainer 20 is constructed in a manner that seeks to maximize its filtering surfaces 40, that construction also seeks to reduce the projected area of the suction strainer 20 such that the suction strainer 20 can withstand both high levels of hydrodynamic impact loading and minimize bending moments on the attachment piping 102 (FIG. 10).

An annular connection flange 38 encircles and is connected to the core wall 30 at the downstream end 24. The connection flange 38 is preferably constructed and arranged for attachment to a corresponding flange (not shown) in the suction line 102 (FIG. 10) of a pump 104 (FIG. 10). The connection flange 38 is depicted in simplified form in FIG. 1 in an effort to clarify the view. The connection flange 38 preferably includes a plurality of bolt holes (not shown) therethrough that facilitate connection to the corresponding flange, as should be understood by those reasonably skilled in the art. In accordance with the preferred embodiments of the present invention, the connecting flange 38 refers, for example and not limitation, to a standard bolted flange connection. In accordance with alternate embodiments of the present invention a flange 38 is not employed, and the suction strainer 20 is connected to the suction line 102 by virtue of threading, welding, or other conventional fastening techniques or devices.

When the suction strainer 20 is connected to the suction line 102 (FIG. 10) of an ECCS pump 104 (FIG. 10), liquid is drawn into the suction strainer 20 through the perforations defined through the filtering surface 40. The filtering surface 40 functions to collect solids (not shown) on the suction strainer 20. Once liquid is drawn through the filtering surface 40, the liquid is drawn through the openings (for example, see openings 74,76,78 in FIG. 5) defined through that portion of the core wall 30 that is internal to the filtering structure 28.

Referring back to the plate assemblies 42a–c, they preferably encircle the longitudinal axis 34, and the exposed surfaces of the plate assemblies 42a–c constitute a substantial portion of the filtering surface 40. The plate assemblies 42a–c include perforated plate walls 44a–f and perforated outer annular walls 46a–c that preferably encircle the longitudinal axis 34. More particularly, and representative of the construction of the plate assemblies 42b,c, the plate assembly 42a includes the plates walls 44a,b which face one another and are separated by a longitudinal distance. The plate walls 44a,b each define a peripheral edge (as an example, see peripheral edge 47 of plate wall 44' in FIG. 6), and the outer wall 46a spans and is connected between the peripheral edge of the plate wall 44a and the peripheral edge of the plate wall 44b. Each of the plate walls 44a–e define a plate hole (as an example, see plate hole 48 of plate wall 44' in FIG. 6) therethrough, and the plate holes are preferably circular and centered with respect to their respective plate wall 44a–e. The internal core tube 26 extends and is connected through the plate holes (as an example, see plate hole 48 of plate wall 44' in FIG. 6). The filtering structure 28 further includes a plurality of inner walls 43a,b. The inner walls 43a,b are preferably annular. The inner walls 43a,b are also preferably perforated such that they constitute the remainder of the filtering surface 40. The inner walls 43a,b preferably encircle the longitudinal axis 34, and the inner wall 43a is connected between the plate assemblies 42a,b while the inner wall 43b is connected between the plate assemblies 42b,c.

Figure 2:
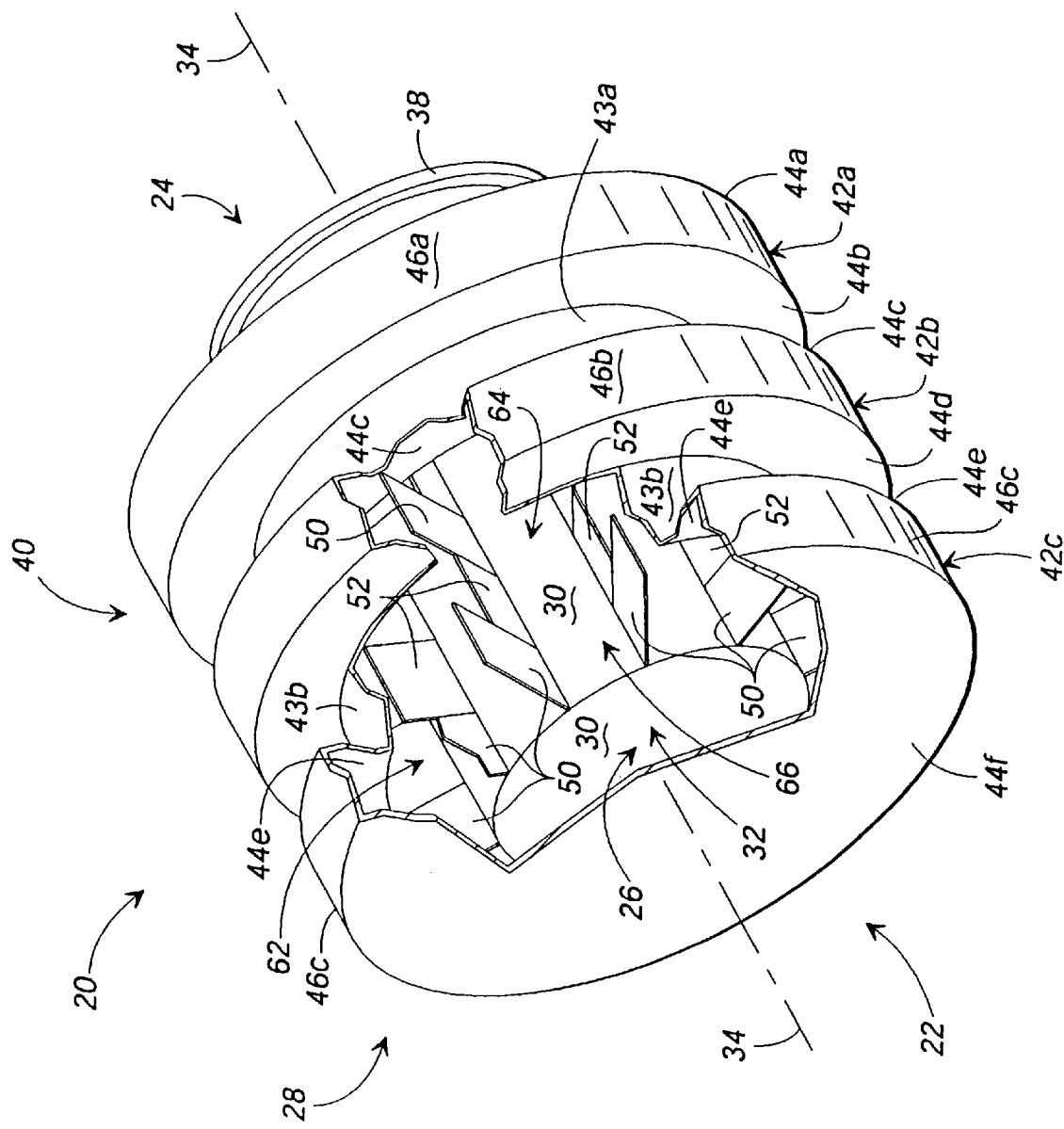
FIG. 2 is a schematic, partially cut-away, upstream end, perspective view of the suction strainer of FIG. 1.

FIG. 2 is a schematic, partially cut-away, upstream end, perspective view of the suction strainer 20, in accordance with the first example of the first preferred embodiment of the present invention. Portions of the plate assemblies 42b,c and the inner wall 43b are cut-away to expose the portion of the internal core tube 26 that is proximate to the upstream end 22. FIG. 2 is schematic in nature by virtue of the fact that perforations are not shown extending through the plate assemblies 42a–c or the inner walls 43a,b, and the openings (for example, see openings 74,76,78 in FIG. 5) that extend through the core wall 30 are not depicted in an effort to clarify the view. As mentioned above, the plate walls 44a–e each define a plate hole (for example see plate hole 48 in FIG. 6) therethrough, through which the internal core tube 26 extends and is connected. Conversely, the plate wall 44f, which is partially cut-away in FIG. 2, does not define such a plate hole such that the plate wall 44f functions to cover the upstream end 22 of the internal core tube 26 and the core chamber 32. Except for that difference between the plate wall 44f and the other plate walls 44a–e, the plate assembly 42c is representative of the plate assemblies 42a,b.

In accordance with the first preferred embodiment of the present invention, the internal core tube 26 functions as a structural member that supports the filtering structure 28. The filtering structure 28 and the internal core tube 26 are interconnected in a manner that synergistically strengthens the suction strainer 20. In accordance with the first preferred embodiment of the present invention, the strengthening is enhanced by a plurality of structural members 50 that are preferably rectangular and planar. The structural members 50 are disposed within and are effectively part of each of the plate assemblies 42a–c. Some of the structural members 50 are cut-away in FIG. 2 to clarify the view. In accordance with the first preferred embodiment of the present invention, the strengthening is also enhanced by a plurality of shorter structural members 52 that are preferably rectangular and planar. Structural members 52 are associated with each of the inner walls 43a,b. In accordance with the first preferred embodiment of the present invention, the structural members 50,52 are solid. In accordance with alternate embodiments of the present invention, holes or other perforations are defined through the structural members 50,52. In accordance with the first preferred embodiment of the present invention, the solid structural members 50,52 function to both structurally reinforce the filtering structure 28 and prevent vortexing and air ingestion.

More particularly, and representative of the construction of the plate assemblies 42a,b, the structural members of plate assembly 42c extend radially from the core wall 30 and are angularly displaced about the longitudinal axis 34. Each of the structural members 50 includes an inner edge (for example, see inner edge 54 of structural member 50' in FIG. 7) connected to the core wall 30, an opposite outer edge (for example, see outer edge 56 in FIG. 7) connected to the outer annular wall 46c, a side edge (for example, see side edge 58 in FIG. 7) connected to the plate wall 44f, and an opposite side edge (for example, see side edge in FIG. 7) connected to the plate wall 44e. Further, and representative of the plate assemblies 42a,b, the plate assembly 42c defines an annular plate chamber 62 that is bound by the core wall 30, the outer annular wall 46c, the plate wall 44f, and the plate wall 44e.

The inner wall 43b is representative of the inner wall 43a. The inner wall 43b is connected to a plurality of the structural members 52, wherein the structural members 52 extend radially from the core wall 30 and are angularly displaced about the longitudinal axis 34. Each of the structural members 52 is similar to but sized differently from the structural members 50. Each of the structural members 52 associated with the inner wall 43b include an inner edge connected to the core wall 30, an opposite outer edge connected to the inner wall 43b, a side edge connected to the plate wall 44e, and an opposite side edge connected to the plate wall 44d. (For example, see the inner edge 54, outer edge 56, side edge 58, and side edge 60 of the structural member 50' in FIG. 7.) Further, and representative of the inner wall 43a, the inner wall 43b defines an intermediate chamber 64 that is bounded by the core wall 30, the inner wall 43b, inner portions of the plate wall 44e, and inner portions of the plate wall 44d. In accordance with the first preferred embodiment of the present invention, each of the plate assemblies 42a–c define plate chambers 62 and each of the inner walls 43a,b define intermediate chambers 64, and all of the chambers 62,64 comprise a filter chamber 66. Stated differently, the filter chamber 66 is defined between the core wall 30 and the filtering surface 40 of the filtering structure 28.

As discussed in greater detail below with reference to a first example of the second preferred embodiment of the present invention, in accordance with the first example of the first preferred embodiment of the present invention, the openings defined through the core wall 30 (for example, see openings 74,76,78 defined through core wall 30' in FIG. 5) are uniquely constructed and arranged so that a substantially controlled inflow distribution, which is preferably uniform, is defined along the length of the internal core tube 26 that is internal to the filtering structure 28. A uniform inflow distribution seeks to, among other things, collect the debris on the filtering surface 40 uniformly, from disk to disk or trough to trough, and thereby allow scaling of test results to strainers with different flow rates and different surface areas. This flow pattern control also seeks to assist in preventing vortexing and air ingestion at the suction strainer 20. In accordance with other examples of the first preferred embodiment, the openings defined through the core wall 30 are constructed and arranged so that the internal core tube 26 does not seek to control the inflow distribution.

Figure 3:
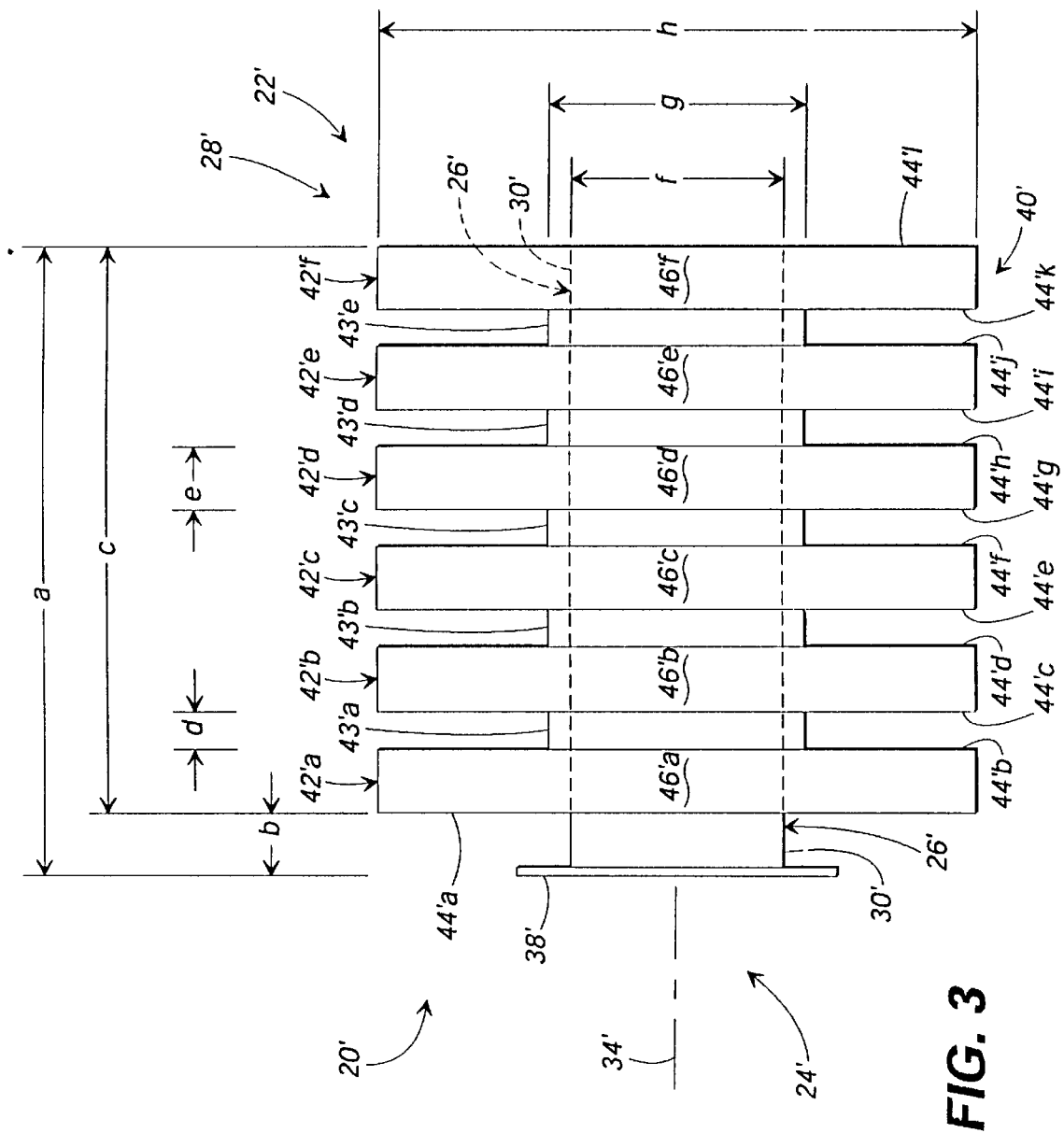
FIG. 3 is a schematic, side elevational view of a suction strainer with an internal core tube in accordance with one example of the second preferred embodiment of the present invention.

FIG. 3 is a schematic, side elevational view of a suction strainer 20' in accordance with a first example of the second preferred embodiment of the present invention. The suction strainer 20' of the first example of the second preferred embodiment is very similar, in general terms, to the suction strainer 20 (FIGS. 1 and 2) of the first example of the first preferred embodiment. Thus, except where specific differences between the suction strainer 20' and the suction strainer 20 are noted or apparent, the following disclosure of the suction strainer 20' should be considered as a supplement to the foregoing disclosure of the suction strainer 20, and visa versa.

In accordance with the second preferred embodiment of the present invention, the internal core tube 26' of the suction strainer 20' is preferably cylindrical and longer than the internal core tube 26 (FIGS. 1 and 2) of the first embodiment. Further, the suction strainer 20' includes more inner walls 43'$a$–$e$ and plate assemblies 42'$a$–$f$ than the suction strainer 20 (FIGS. 1 and 2) of the first preferred embodiment. The plate assemblies 42'$a$–$f$ include plate walls 44'$a$–$l$. The inner walls 43'$a$–$e$ and plate assemblies 42'$a$–$f$ preferably encircle the internal core tube 26', as is indicated by the broken line showing of the internal core tube 26'. FIG. 3 is schematic in nature because, while the inner walls 43'$a$–$e$ and plate assemblies 42'$a$–$f$ preferably define a multiplicity of apertures therethrough, those apertures are not depicted in FIG. 3 in an effort to clarify the view. In accordance with the second preferred embodiment of the present invention, the internal core tube 26' is preferably in the general form of a cylinder that structurally reinforces exterior filtering structure 28'.

In accordance with the second preferred embodiment of the present invention, the suction strainer 20' defines an overall length that is represented by the dimension "a". The core wall 30' defines a first length that does not define openings 74,76,78 (FIG. 5) therethrough, and that first length is represented by the dimension "b". The core wall 30' further defines a second length, represented by the dimension "c", that does define openings 74,76,78 (FIG. 5) therethrough and that is surrounded by the plate assemblies 42'$a$–$f$ and the inner walls 43'$a$–$e$. A separation distance, represented by the dimension "d", is defined between each of the plate assemblies 42'$a$–$f$. Also, each of the plate assemblies 42'$a$–$f$ individually define a thickness that is represented by the dimension "e". The internal core tube 26', inner walls 43'$a$–$e$, and plate assemblies 42'$a$–$f$ define diameters that are represented by the dimensions "f", "g", and "h", respectively. In accordance with one acceptable example of the second preferred embodiments, and in approximation, the dimension "a" is acceptably 36.0 inches, the dimension "b" is acceptably 3.375 inches, the dimension "c" is acceptably 29.875 inches, the dimension "d" is acceptably 2.0 inches, the dimension "e" is acceptably 3.313 inches, the dimension "f" is acceptably 24.0 inches, the dimension "g" is acceptably 26.0 inches, and the dimension "h" is acceptably 42.0 inches.

As suggested by the broken line showing of the core wall 30' in FIG. 3, in accordance with the second preferred embodiment of the present invention, each of the plate walls 44'$a$–$k$ defines a centered plate hole 48 (FIG. 6) therethrough. The internal core tube 26' extends through the plate holes 48. As an exception, however, the plate wall 44'$l$ does not define such a hole 48 and therefore covers the upstream end 22' of the internal core tube 26' and the core chamber (for example see the core chamber 32 of FIGS. 1 and 2). The plate wall 44'$l$ is more fully depicted in FIG. 4, which is a schematic, upstream end, elevational view of the suction strainer 20', in accordance with the first example of the second preferred embodiment of the present invention. The fact that the plate wall 44'$l$ covers the upstream end 22' of the internal core tube 26' is indicated by the broken line showing of the core wall 30' in FIG. 4.

In accordance with the second preferred embodiment of the present invention, each of the plate assemblies 42'$a$–$f$ (FIG. 3) include a plurality of structural members 50' therein; and the arrangement and configuration of the structural members 50' within the plate assembly 42'$f$ is representative of the configuration and arrangement of the structural members 50' within each of the plate assemblies 42'$a$–$e$. As indicated by the broken line showing of the structural members 50' in FIG. 4, the structural members 50' extend radially from and are angularly displaced about the internal core tube 26'. In accordance with the second preferred embodiment, an identical angle "φ" is defined between each adjacent structural member 50', and one acceptable example of the angle "φ" is 60 degrees. In accordance with the second preferred embodiment of the present invention, the inner walls 43'$a$–$e$ are not reinforced by structural components that correspond to the structural members 52 (FIG. 2) of the first preferred embodiment. However, in accordance with alternate embodiments of the present invention the inner walls 43'$a$–$e$ are reinforced by structural components that correspond to the structural members 52 (FIG. 2) of the first preferred embodiment.

Figure 4:
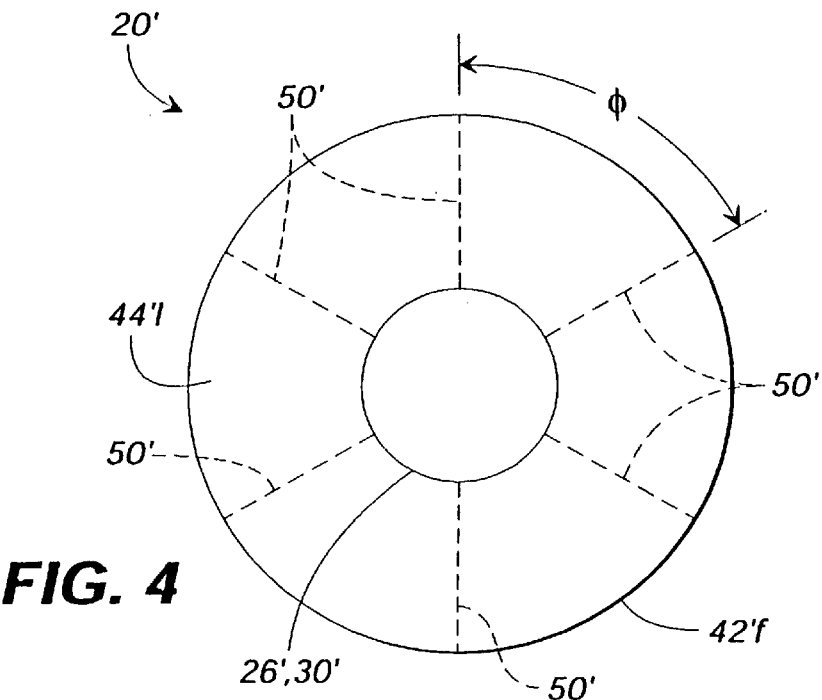
FIG. 4 is a schematic, upstream end, elevational view of the suction strainer of FIG. 3.
Figure 5:
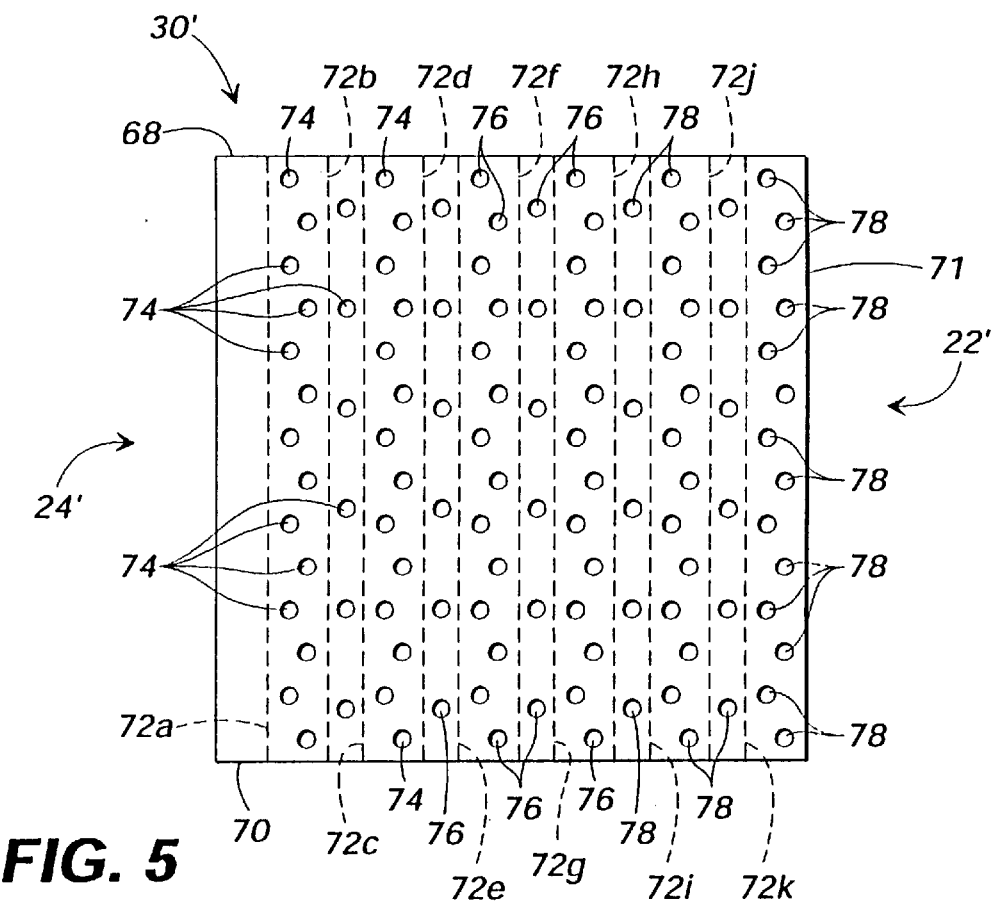
FIG. 5 is an isolated, plan view an internal core tube of the suction strainer of FIG. 3, wherein the internal core tube is in an unrolled and flattened configuration.

FIG. 5 is an isolated, plan view of the core wall 30' in accordance with the first example of the second preferred embodiment of the present invention, wherein the core wall 30' is in an unrolled and flattened configuration. The core wall 30' includes opposite wall edges 68,70 that are preferably joined together in a manner that creates the cylindrical internal core tube 26' (FIG. 3). The internal core tube 26' further includes an upstream edge 71 to which the plate wall 44'$l$ (FIGS. 3 and 4) is affixed. Broken lines 72$a$–$k$ are included in FIG. 5 for explanatory purposes only. The lines 72$a$–$k$ represent the points at which the inner peripheral edges 73 (FIG. 6) of the plate walls 44$a$–$k$ (FIG. 3), respectively, contact the core wall 30' when the plate walls 44$a$–$k$ are properly installed on the cylindrical internal core tube 26' (FIG. 3).

In accordance with the first example of the second preferred embodiment of the present invention, the openings 74,76,78, only a few of which are specifically pointed out in FIG. 5 in an effort to clarify the view, are in the form of circular holes which extend through the core wall 30'. Also, in accordance with the second preferred embodiment of the present invention, open areas are defined through the core wall 30' by virtue of the openings 74,76,78. Each individual opening 74,76,78 represents or defines an open area. The open area of an individual opening 74,76,78 is representative of the capacity of that individual opening 74,76,78 to pass liquid. Thus, the open area can acceptably be measured perpendicular to the direction of liquid flow through the most restrictive portion of an opening 74,76,78. In accordance with the first example of the second preferred embodiment of the present invention, the openings 78 are the only type of openings defined between the lines 72h and the upstream end 22' of the core wall 30', the openings 76 are the only type of openings defined between the lines 72d,h,and the openings 74 are the only type of openings defined between the lines 72a,d.

Unit areas consisting of a portion of the core wall 30' can be considered to define open areas, wherein the open area of a unit area is the summation all of the individual open areas defined within that unit area. Accordingly, and for example and not limitation, a plurality of core units can be defined as extending sequentially along the length of the internal core tube 26' (FIG. 3). In accordance with one acceptable example of such a sequential arrangement of core units, a first unit of the plurality of units can acceptably and hypothetically be identified as being that portion of the core wall 30' defined between the lines 72b,d. That first unit defines a first unit open area equal to the summation of the open areas of each of the openings 74 defined between the lines 72b,d. Similarly, a second unit of the plurality of units can acceptably and hypothetically be identified as being that portion of the core wall 30' defined between the lines 72d,f. That second unit defines a second unit open area equal to the summation of the open areas of each of the openings 76 defined between the lines 72d,f. In accordance with the first example of the second preferred embodiment of the present invention, the first unit open area is smaller than the second unit open area such that when a pump draws liquid through the wall 30' of the internal core tube 26' (FIG. 3), the flow (i.e., inflow) of liquid through the first unit is substantially similar to the inflow of liquid through the second unit. The lines 72a–k are used in the foregoing example only because they aid in the explanation of the concept of core units. The lines 72a–k are not intended to and should not limit the hypothetical configuration of core units. Core units can be conceptualized and defined without any reference to the lines 72a–k. For example and not limitation, it is acceptable for the edge of a core unit to be located at any location between neighboring lines 72.

As evidenced by the foregoing, in accordance with the first example of the second preferred embodiment of the present invention, the openings 74,76,78 are constructed and arranged such that less open area is defined near the downstream end 24' (FIG. 3) than the upstream end 22' (FIG. 3). Thus, when liquid is drawn into the core chamber (for example see the core chamber 32 of FIGS. 1 and 2) by a pump or the like, a substantially uniform flow (i.e., inflow) distribution is defined along the length of the internal core tube 26' (FIG. 3). In accordance with the first example of the second preferred embodiment of the present invention, the variation in open area of the core wall 30' (e.g., the variation in the open area of the internal core tube 26') is achieved by varying the sizing of the openings 74,76,78. In other words, in accordance with the first example of the second preferred embodiment of the present invention, the pattern of the openings 74,76,78 does not vary significantly along the length of the core wall 30'. More particularly, the opening pattern defined between the lines 72a,b is repeated between the lines 72c,d, the lines 72e,f, the lines 72g,h, the lines 72i,j, and the line 72k and the upstream end 22' of the core wall 30'. Similarly, the opening pattern defined between the lines 72b,c is repeated between the lines 72d,e, the lines 72f,g, the lines 72h,i, and the lines 72j,k. Accordingly, in accordance with the first example of the second preferred embodiment of the present invention, the variation in open area is achieved by virtue of the fact that the openings 78 (which are preferably the only type of openings defined between the lines 72h and the upstream end 22' of the core wall 30') are larger than the openings 74; and the openings 74 (which are preferably the only type of openings defined between the lines 72d,h) are larger than the openings 72 (which are preferably the only type of openings defined between the lines 72a,d). In accordance with first example of the second preferred embodiment of the present invention, each of the openings 74 acceptably defines a diameter of approximately 0.875 inches, each of the openings 76 defines a diameter of approximately 1.063 inches, and each of the openings 78 defines a diameter of approximately 1.25 inches. Also in accordance with the first example of the second preferred embodiment of the present invention, the core wall 30' is acceptably constructed from a sheet of steel such as, but not limited to, a piece of quarter inch coated A36 carbon or uncoated stainless steel.

As mentioned above, in accordance with the first example of the second preferred embodiment of the present invention the variations in open area along the length of the internal core tube 26' (FIGS. 3 and 4) are established by repeating the pattern of openings but varying the size of the openings defined through the core wall 30'. However, In accordance with alternate embodiments of the present invention all of the openings defined through the core wall 30' are the same size, and the variations in open area along the length of the internal core tube 26' (FIG. 3) are established by varying the pattern of the openings through the core wall 30'. In other words, in accordance with alternate embodiments of the present invention, the variation in open area exists by virtue of the fact that more openings are defined through the core wall 30' proximate to the upstream end 22' (FIG. 3) of the internal core tube 26'. Also, in accordance with other examples of the second preferred embodiment, the open areas through the core wall 30' are substantially uniform along the length of the internal core tube 26', whereby uniform inflow along the length of the internal core tube 26' is not provided.

FIG. 6 is an isolated, schematic, elevational view of a plate wall 44' that is representative of the plate walls 44'a–k (FIG. 3), in accordance with the second preferred embodiment of the present invention. The plate wall 44' includes an outer peripheral edge 47 and an inner peripheral edge 73 that encircles and defines a central plate hole 48. The internal core tube 26' (FIG. 3) extends through the central plate holes 28 of the plate walls 44'a–k (FIG. 3). The plate wall 44' depicted in FIG. 6 is not representative of the plate wall 44l (FIG. 3) because the plate wall 44l does not define a plate hole 48 therethrough, as mentioned above.

FIG. 6 is schematic in nature because each of the plate walls 44'a–l (FIG. 3) define a multiplicity of perforations therethrough that are preferably evenly distributed. The perforations are not clearly shown in FIG. 6 in an effort to clarify the view, however a sampling of the perforations is schematically represented by dots. In accordance with the second preferred embodiment of the present invention, an acceptable size of each individual perforation is within the range of approximately 0.0625 inches to approximately 0.250 inches. In accordance with one acceptable example, the perforations are so sized and so numerous that each of the plate walls 44'a–l is approximately forty percent open area. Also, the plate walls 44'a–l are acceptably constructed from a material such as, but not limited to, eleven gauge carbon or stainless steel. In accordance with an alternate embodiment of the present invention, the portion of the plate wall 44'l (FIG. 3) that covers the upstream end of the core chamber (for example see core chamber 32 in FIG. 2) is not perforated.

The term "percent open area" as used within this disclosure can be explained with reference to the plate wall 44'. For example, before the plate wall 44' is perforated it is zero percent open, whereas after the plate wall 44' is perforated it includes a multiplicity of perforations such that the plate wall 44' defines an open area. Each individual perforation represents or defines an open area which is representative of the capacity of that perforation to pass liquid, as discussed above. Further, unit areas consisting of a portion of the plate wall 44' can be considered to define an open area, wherein the open area of a unit area is the summation all of the individual open areas defined within that unit area. For example, if a one square inch surface area of the plate wall 44' is identified before the plate wall 44' is perforated, that square inch surface area is zero percent open. After the plate wall 44' is perforated and that one square inch surface area includes a plurality of perforations therethrough, that square inch surface area is some percent open. If the sum of all of the open areas in that one square inch surface add up to an area of 0.4 square inches, then that square inch surface area is forty percent open. If the entire plate wall 44' is perforated in a manner substantially similar to that one square inch, the plate wall 44' is forty percent open.

FIG. 7 is an isolated, elevational view of a structural member 50' in accordance with the second preferred embodiment of the present invention. In accordance with the second preferred embodiment of the present invention, the structural members 50' are solid. In accordance with the second preferred embodiment of the present invention, the solid structural members 50' function to both structurally reinforce the filtering structure 28' (FIG. 3) and prevent vortexing. In accordance with alternate embodiments of the present invention, a plurality of holes are defined through the structural members 50'. The holes seek to equalize flow within the filter chamber (for example, see the filter chamber 66 in FIG. 2).

In accordance with the second preferred embodiment of the present invention, structural members 50' are incorporated into each of the plate assemblies 42'a–f (FIG. 3). Each of the structural members 50' extends radially from the core wall 30' (FIG. 3). Further, structural members 50' within a single plate assembly 42' are, in accordance with the second preferred embodiment, angularly displaced about the longitudinal axis 34' (FIG. 3) as depicted in FIG. 4. In accordance with various alternate embodiments of the present invention, each plate assembly 42' preferably includes six or more structural members 50' angularly displaced about the longitudinal axis 34'. Each of the structural members 50' includes an inner edge 54 connected to the internal core tube 26' (FIG. 3), an opposite outer edge 56 connected to the respective outer wall 46' (FIG. 3), a side edge 58 connected to the one plate wall 44' (FIGS. 3 and 6), and an opposite side edge 60 connected to another plate wall 44'. In accordance with the second preferred embodiment of the present invention the structural members 50' are acceptably constructed from a sheet of steel such as, but not limited to, a piece of eighth-inch carbon or stainless steel. In accordance with the second preferred embodiment of the present invention, structural members 52 (FIG. 2) are not employed. In accordance with an alternate embodiment of the present invention, structural members 52 are employed.

FIG. 8 is an isolated, schematic, plan view of an representative outer wall 46' of a plate assembly 42' (FIG. 3), wherein the outer wall 46' is In an unrolled and flattened configuration in accordance with the second preferred embodiment of the present invention. The outer wall 46' includes opposite short edges 80,82 that are preferably connected such that the outer wall 46' encircles the longitudinal axis 34' (FIG. 3). The outer wall 46' further includes opposite elongated side edges 84,86. In a representative plate assembly 42' (FIG. 3), the elongated edge 84 of the outer wall 46' is connected to the outer peripheral edge 47 (FIG. 6) of one of the plate walls 44', and the other elongated edge 86 of the outer wall 46' is connected to the outer peripheral edge 47 of the other plate wall 44'.

FIG. 9 is an isolated, schematic, plan view a representative inner wall 43' of the suction strainer 20' (FIG. 3), wherein the inner wall 43' is in an unrolled and flattened configuration in accordance with the second preferred embodiment of the present invention. The inner wall 43' includes opposite short edges 88,90 that are preferably connected such that the inner wall 43' encircles the longitudinal axis 34' (FIG. 3). The inner wall 43' further includes opposite elongated edges 92,94. With respect to an exemplary inner wall 43', the elongated edge 92 is connected to one plate wall 44' (FIG. 3) while the other elongated edge 94 is connected to another plate wall 44'.

FIGS. 8 and 9 are schematic in nature because each of walls 43',46' define a multiplicity of perforations therethrough that are preferably evenly distributed. The perforations are not clearly shown in FIGS. 8 and 9 for the sake of clarity, however a sampling of the perforations is schematically represented by dots. In accordance with the second preferred embodiment of the present invention, and with respect to the inner walls 43'a–e (FIG. 3) and outer walls 46'a–f (FIG. 3), an acceptable size for each individual perforation is within the range of approximately 0.0625 inches to approximately 0.125 inches. In accordance with one acceptable example, the perforations through the walls 43'a–e,46'a–f are so sized and so numerous that each of the walls 43'a–e,46'a–f are approximately forty percent open. In accordance with the second preferred embodiment of the present invention, the walls 43',46' are acceptably constructed, for example and not limitation, from a sheet of metal such as, but not limited to, a piece of eleven gauge carbon or stainless steel. In accordance with alternate embodiments of the present invention, the walls 43'a–e, 46'a–f are acceptably constructed, for example and not limitation, from wire wrapped well screen.

Referring to FIG. 10, which is a schematic representation of portions of a BWR nuclear power plant, in accordance with the preferred embodiments of the present invention, the suction strainer 20 (FIGS. 1 and 2) and the suction strainer 20' (FIGS. 3 and 4) are preferably connected to an ECCS of a BWR nuclear power plant. FIG. 10 depicts a portion of an ECCS following a LOCA. The suction strainer 20 is submerged in a suppression pool 100, where the suction strainer 20 is connected to the downstream end of a suction line 102 through which an ECCS pump 104 draws water 105 from the suppression pool 100. In one mode of operation (which is generally depicted in FIG. 10), the ECCS pump 104 discharges through a discharge line 106 to a reactor core 108. In another mode of operation, the ECCS pump 104 discharges back to the suppression pool 100. The suction strainers 20,20' are uniquely constructed and arranged, and operate, such that they are capable of being readily incorporated into, optimize the operation of, and are capable of withstanding the rigors associated with, ECCSs.

Figure 11:
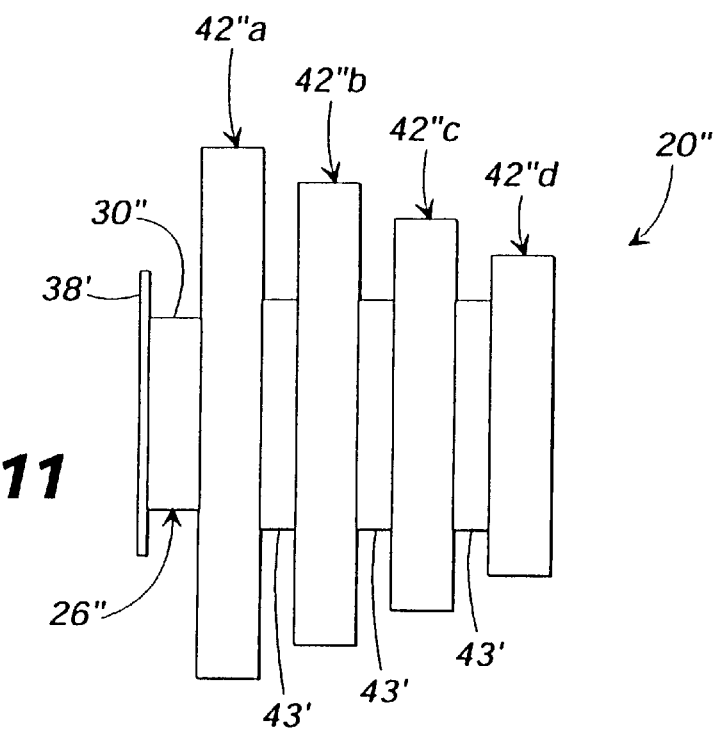
FIG. 11 is a schematic, side elevational view of a suction strainer with an internal core tube in accordance with an alternate embodiment of the present invention.
Figure 12:
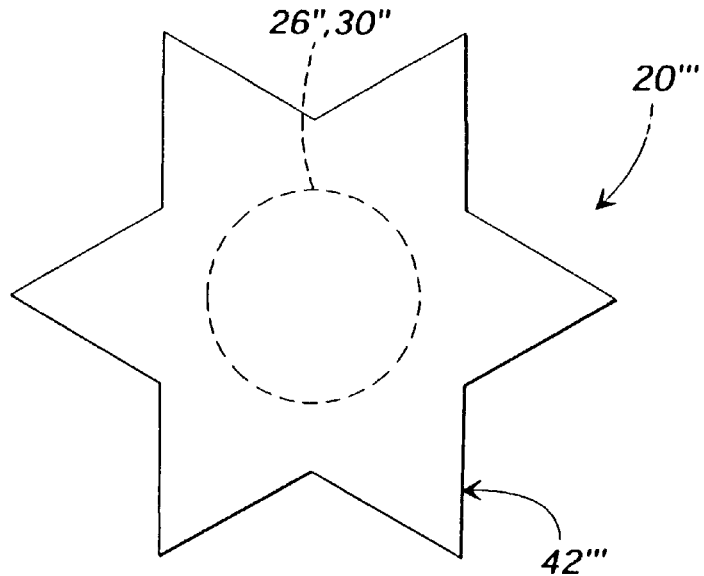
FIG. 12 is a schematic, upstream end, elevational view of a suction strainer with an internal core tube in accordance with another alternate embodiment of the present invention.
Figure 13:
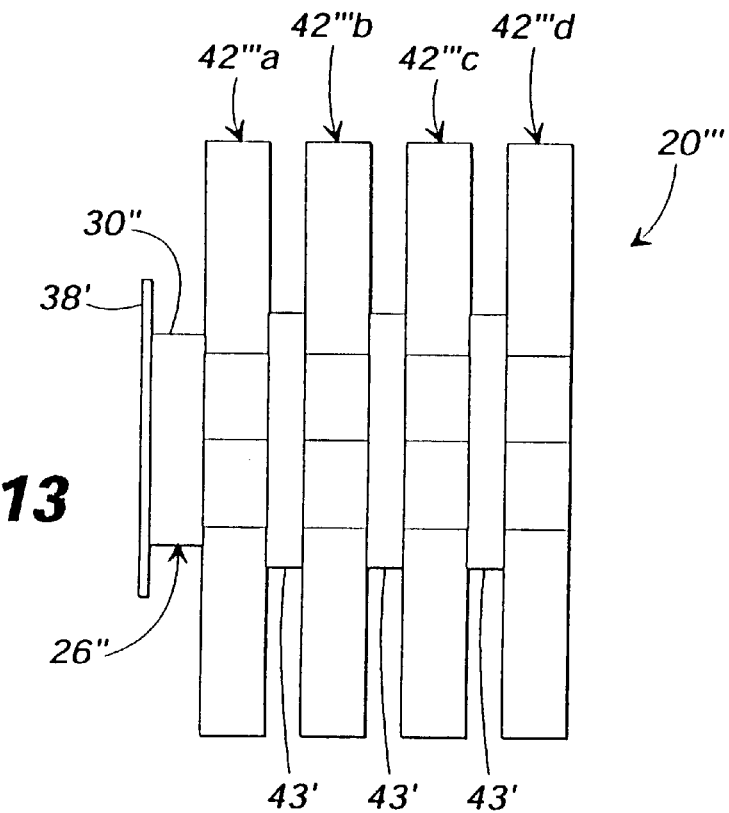
FIG. 13 is a schematic, side elevational view of the suction strainer of FIG. 12.

It should be understood that the specific construction and arrangements of the suction strainer 20 (FIGS. 1 and 2) and the suction strainer 20' (FIGS. 3 and 4) are provided as acceptable examples only. The broad concepts disclosed with respect to the suction strainer 20 and the suction strainer 20' lend themselves to a variety of differently configured suction strainers, and configurations will vary depending upon desired flow rates, space constraints, and the hydrodynamic forces that a particular suction strainer and the attachment ECCS piping will be potentially subjected to. For example, FIG. 11 is a schematic, side elevational view of a suction strainer 20" in accordance with an alternate embodiment of the present invention. The suction strainer 20" depicted in FIG. 11 is substantially similar to the suction strainer 20' of the second preferred embodiment, except that it includes less plate assemblies 42"*a–d,* and the diameters of the plate assemblies 42"*a–d* taper. As another example, FIG. 12 is a schematic, upstream end, elevational view of a suction strainer 20'", in accordance with another alternate embodiment of the present invention. FIG. 13 is a schematic, side elevational view of the suction strainer 20'" of FIG. 12. The suction strainer 20'" depicted in FIGS. 12 and 13 is substantially similar to the suction strainer 20' of the second preferred embodiment, except that the suction strainer 20'" includes less plate assemblies 42"*a–d,* and the plate assemblies 42'"*a–d* are star-shaped. The plate assemblies 42'" encircle the internal core tube 26", as is indicated by the broken line showing of the internal core tube 26" and core wall 30" in FIG. 12.

As an additional example, another embodiment of the present invention includes a convertible suction strainer (not shown) that includes a 170 square foot filtering surface (for example see the filtering surface 40 in FIGS. 1 and 2), 13 disks (for example see the plate assemblies 42 in FIGS. 1 and 2) that are 40 inches in diameter, and a 24 inch flange (for example see the connection flange 38 of FIG. 1), wherein the convertible suction strainer is 48 inches long from the first to the last disk. The internal core tube (for example see the internal core tube 26 in FIGS. 1 and 2) of the convertible suction strainer has large evenly spaced holes therethrough that are not constructed and arranged to control inflow through the internal core tube. The internal core tube of the convertible suction strainer is constructed and arranged to structurally support a filtering structure (for example see the filtering structure 28 in FIGS. 1 and 2) that is connected to and extends radially from the internal core tube. The downstream end of the internal core tube of the convertible suction strainer is covered with a perforated plate (for example see the plate wall 44'*l* in FIG. 3) that can be temporarily opened to provide an opening to the core chamber that is defined by the internal core tube (i.e., the first internal core tube). A second internal core tube is capable of being inserted through the provided opening so that it is installed within the core chamber of the first internal core tube. The second internal core tube is constructed and arranged to control the inflow of water, in the manner discussed above, such that substantially even inflow is established along the length of the first internal core tube.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative relationships and dimensions shown on the drawings are given as preferred relative relationships and dimensions, but the scope of the invention is not to be limited thereby.

We claim:

1. A suction strainer for removing solids from a flow of liquid being drawn toward the suction line of a pump, the suction strainer comprising:

an internal core including an upstream end and a downstream end, said core further including a core wall defining
    an internal chamber that is encircled by said core wall,
    a longitudinal axis extending through said internal chamber and said core,
    a primary opening at said downstream end that is open to said internal chamber, and
    a plurality of core apertures through said core wall, each aperture of said plurality of core apertures being open to said internal chamber and defining an open area; and
an exterior screening structure that is received over said core so as to be structurally supported by said core and which includes a plurality of disks spaced sequentially along said core,
wherein each disk of said plurality of disks includes a pair of disk walls,
wherein each wall of each said pair of disk walls is supported by said core, and extends radially from said core to define a peripheral edge displaced from and surrounding said core, wherein said disk walls of each said pair of disk walls are longitudinally displaced from one another so as to define a disk chamber therebetween, and
wherein each wall of each said pair of disk walls defines a first plurality of disk apertures therethrough that are open to said disk chamber, and
wherein each disk of said plurality of disks further includes an outer wall connected to and spanning between said peripheral edges of each said pair of disk walls, and defining a second plurality of disk apertures therethrough that are open to said disk chamber, and
wherein adjacent disks of said plurality of disks are longitudinally displaced along said core such that a separation distance is defined between adjacent disks of said plurality of disks.

2. The suction strainer of claim 1, wherein said exterior structure further includes a plurality of inner walls encircling said core and spanning between adjacent disks of said plurality of disks.

3. The suction strainer of claim 1, wherein the suction strainer further comprises a flange connected to said downstream end of said core and encircling said primary opening.

4. The suction strainer of claim 1, wherein disks of said plurality of disks further include a plurality of structural members, wherein said structural members are angularly displaced about said core and extend radially between said core wall and said outer wall.

5. The suction strainer of claim 4, wherein said structural members extend between said a pair of disk walls.

6. A suction strainer for connection to a suction pipe of a pump, said suction strainer comprising:
    a core tube including at least one open end and a core wall having a plurality of spaced flow openings formed therein, said core tube defining a core chamber;
    an exterior screening structure defining a plurality of spaced perforations opening to said core chamber, said exterior screening structure extending at least partially about the core wall of said core tube and structurally supported on said core tube; and
    a plurality of spaced structural members angularly displaced along the core wall of said core tube and extending radially therefrom, said structural members being constructed and arranged to support said exterior screening structure on said core tube.

7. The suction strainer as claimed in claim 6 wherein said core tube further defines a longitudinal axis passing centrally through said core chamber, and wherein said exterior screening structure comprises a plurality of straining assemblies, each straining assembly including a straining surface defining a surface contour having radial direction components relative to said longitudinal axis and axial direction components relative to said longitudinal axis.

8. The sunction strainer as claimed in claim 7 wherein said plurality of straining assemblies comprises of plurality of spaced plate assemblies.

9. The sunction strainer as claimed in claim 8 wherein said plurality of straining assemblies each further include at least one inner wall spaced from and extending at least partially about the core wall of said core tube.

10. The sunction strainer as claimed in claim 9 wherein said at least one inner wall extends between and is connected to each plate assembly of said plurality of spaced plate assemblies to define a trough therebetween.

11. The suction strainer as claimed in claim 6 wherein said straining surface of each said straining assembly includes two radial surface segments extending radially relative to the longitudinal axis and having generally no axial direction component, and an axial surface component joining said two radial surface segments and having generally no radial direction component.

12. A suction strainer for connection to a suction pipe of a pump to remove solids from liquid drawn through said suction strainer by the pump, said suction strainer comprising:

an elongated core tube having a plurality of spaced flow openings passing therethrough and defining a core chamber therein, said core tube having at least one open end; and an exterior screening structure positioned along and structurally supported by said core tube, said exterior screening structure including a plurality of perforated plate assemblies defining a screening chamber between said plurality of plate assemblies and said core tube, and a plurality of spaced structural members extending radially from and angularly displaced along a core wall of said core tube, said structural members disposed between said core tube and said plate assemblies and being constructed and arranged to structurally support said plate assemblies on said core tube.

\* \* \* \* \*